(12) United States Patent
Yoshikawa

(10) Patent No.: US 10,623,507 B2
(45) Date of Patent: Apr. 14, 2020

(54) COMMUNICATION APPARATUS, CONTROL METHOD AND NON-TRANSITORY COMPUTER-READABLE STORAGE MEDIUM

(71) Applicant: CANON KABUSHIKI KAISHA, Tokyo (JP)

(72) Inventor: Yuki Yoshikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 15/756,147

(22) PCT Filed: Jul. 13, 2016

(86) PCT No.: PCT/JP2016/003316
§ 371 (c)(1),
(2) Date: Feb. 28, 2018

(87) PCT Pub. No.: WO2017/037992
PCT Pub. Date: Mar. 9, 2017

(65) Prior Publication Data
US 2018/0255147 A1  Sep. 6, 2018

(30) Foreign Application Priority Data
Sep. 2, 2015  (JP) .................................. 2015-173289

(51) Int. Cl.
*H04W 4/00* (2018.01)
*H04L 29/08* (2006.01)
(Continued)

(52) U.S. Cl.
CPC .......... *H04L 67/16* (2013.01); *H04L 67/2861* (2013.01); *H04L 67/303* (2013.01);
(Continued)

(58) Field of Classification Search
CPC ..... H04L 29/08; H04L 67/16; H04L 67/2861; H04L 67/303; H04L 67/325; H04W 8/005;
(Continued)

(56) References Cited

U.S. PATENT DOCUMENTS 9,693,217 B2 * 6/2017 Kasslin .................. H04W 8/005
10,091,640 B2 * 10/2018 Park ........................ H04W 60/06
(Continued)

FOREIGN PATENT DOCUMENTS

JP  2011511588 A  4/2011
JP  2013515443 A  5/2013
(Continued)

OTHER PUBLICATIONS

Lambert et al, Enabling Always on Service Discovery: WIFI Neighbor Awareness Networking, IEEE, 8 pages, Apr. 2015.*

*Primary Examiner* — Frank Duong
(74) *Attorney, Agent, or Firm* — Canon U.S.A., Inc. IP Division

(57) ABSTRACT

An apparatus which acquires service information can acquire service information of another apparatus even in a period in which the other apparatus is not enabled to perform wireless communication and can perform communication for executing a service in a period in which the other apparatus is enabled to perform wireless communication. In a case where service information of a proxy client apparatus transmitted by proxy by the proxy client apparatus is received, a period in which the proxy client apparatus is enabled to perform wireless communication is determined based on information acquired from a proxy apparatus and performs communication with the proxy client apparatus for executing a service described in the service information of the proxy client apparatus in a period in which the proxy
(Continued)

client apparatus is enabled to perform wireless communication.

21 Claims, 13 Drawing Sheets

(51) Int. Cl.
*H04W 8/00* (2009.01)
*H04W 52/02* (2009.01)
*H04W 88/18* (2009.01)
*H04W 4/80* (2018.01)

(52) U.S. Cl.
CPC ............. *H04L 67/325* (2013.01); *H04W 4/80* (2018.02); *H04W 8/005* (2013.01); *H04W 52/0216* (2013.01); *H04W 52/0241* (2013.01); *H04W 88/182* (2013.01); *Y02D 70/142* (2018.01)

(58) Field of Classification Search
CPC ..... H04W 48/08; H04W 48/16; H04W 52/02; H04W 52/0216; H04W 52/0241; H04W 84/18; H04W 88/18; H04W 88/182; H04W 4/80; Y02D 70/142

See application file for complete search history.

(56) References Cited

U.S. PATENT DOCUMENTS

| 2009/0240794 | A1 | 9/2009 | Liu et al. |
| 2011/0153773 | A1 | 6/2011 | Vandwalle et al. |
| 2014/0269555 | A1 | 9/2014 | Sadasivam et al. |
| 2015/0036540 | A1 | 2/2015 | Kasslin et al. |
| 2016/0198006 | A1* | 7/2016 | Tsai ............... H04L 67/104 370/329 |
| 2016/0270137 | A1* | 9/2016 | Yong .............. H04W 76/14 |
| 2016/0352782 | A1* | 12/2016 | Patil .............. H04L 65/105 |

FOREIGN PATENT DOCUMENTS

| JP | 5296104 B2 | 9/2013 |
| JP | 2015-525993 A | 9/2015 |
| JP | 2016-502313 A | 1/2016 |
| WO | 2014/150977 A1 | 9/2014 |
| WO | 2015/038272 A1 | 3/2015 |

* cited by examiner

[Fig. 1]
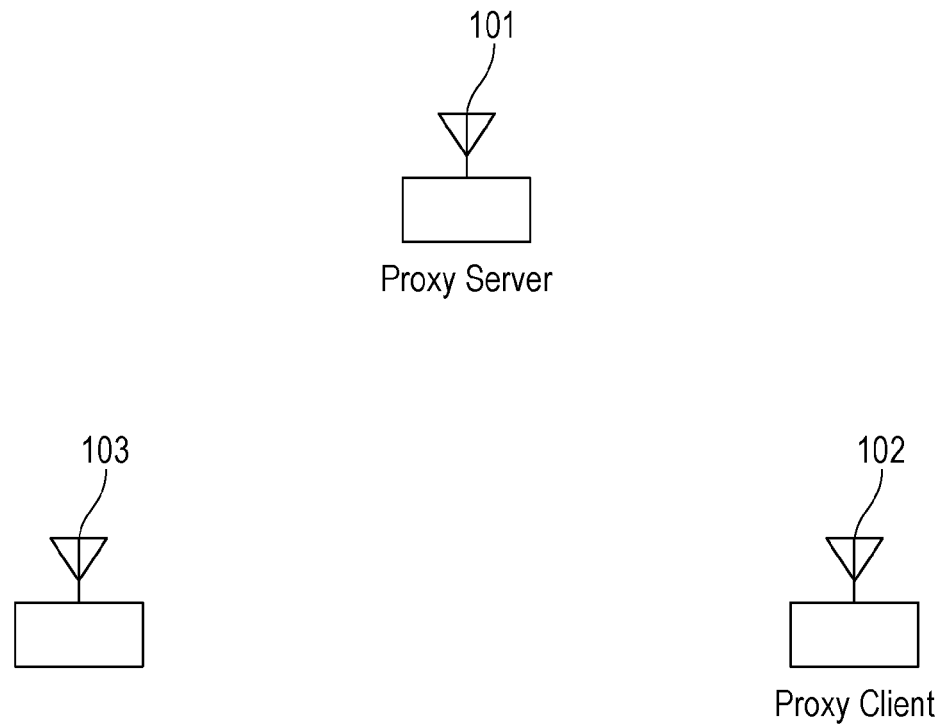
[Fig. 2]
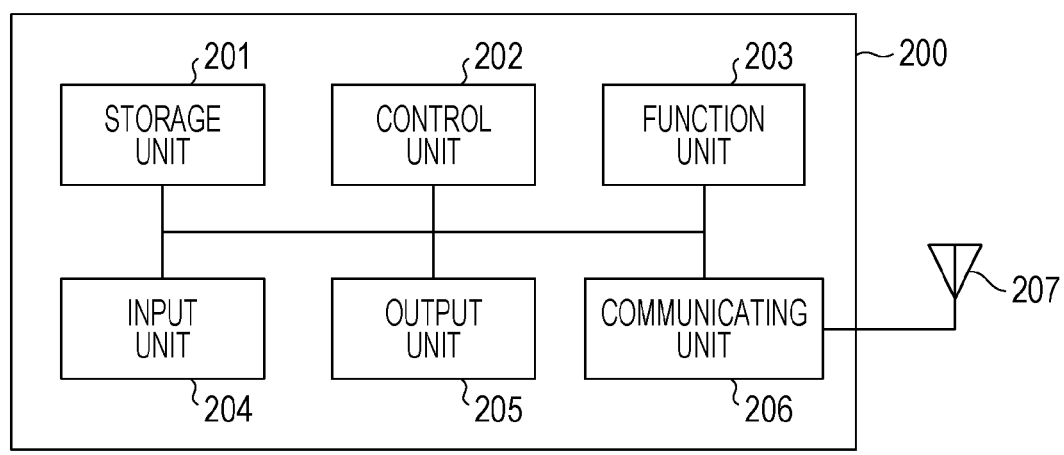

[Fig. 3A]
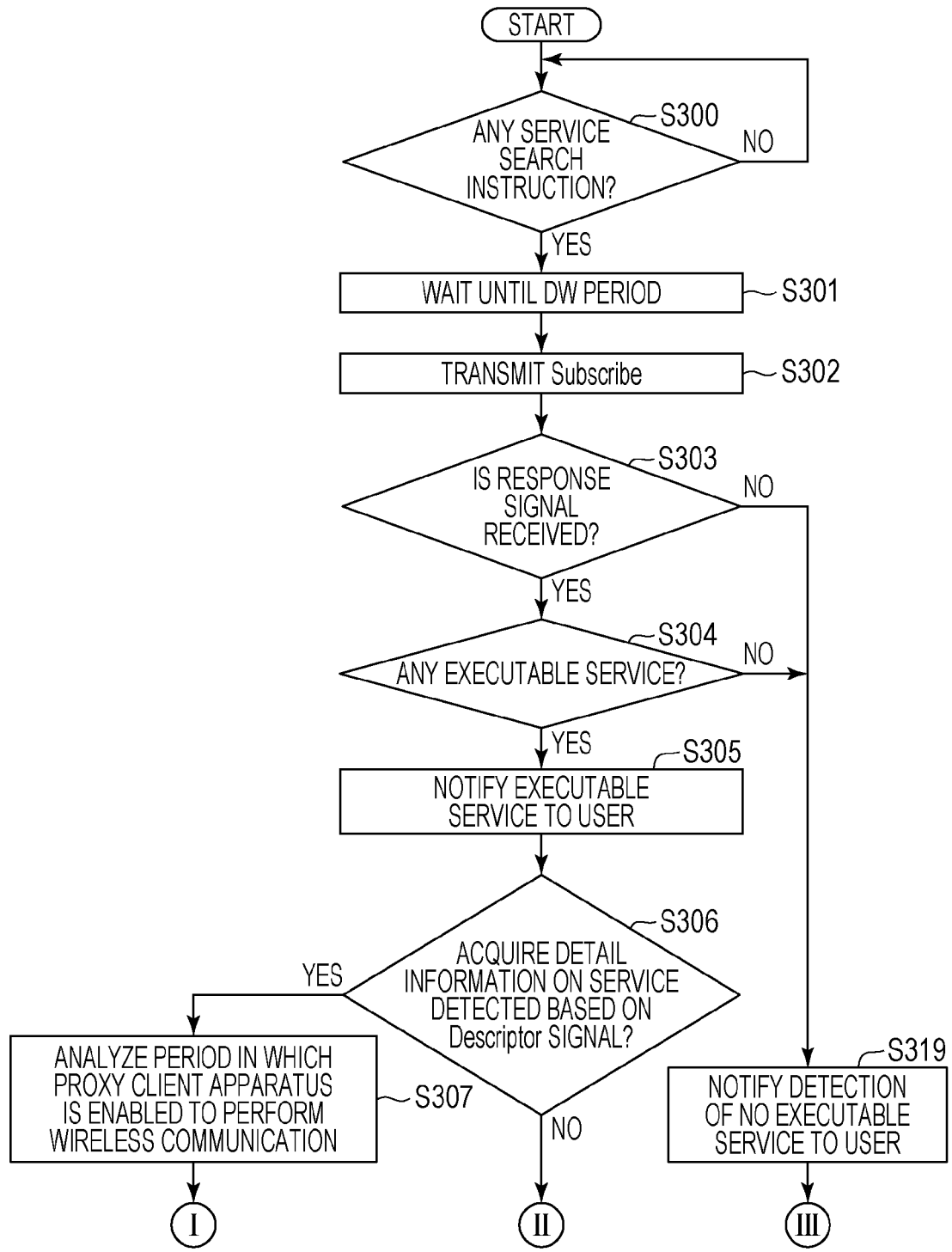

[Fig. 3B]
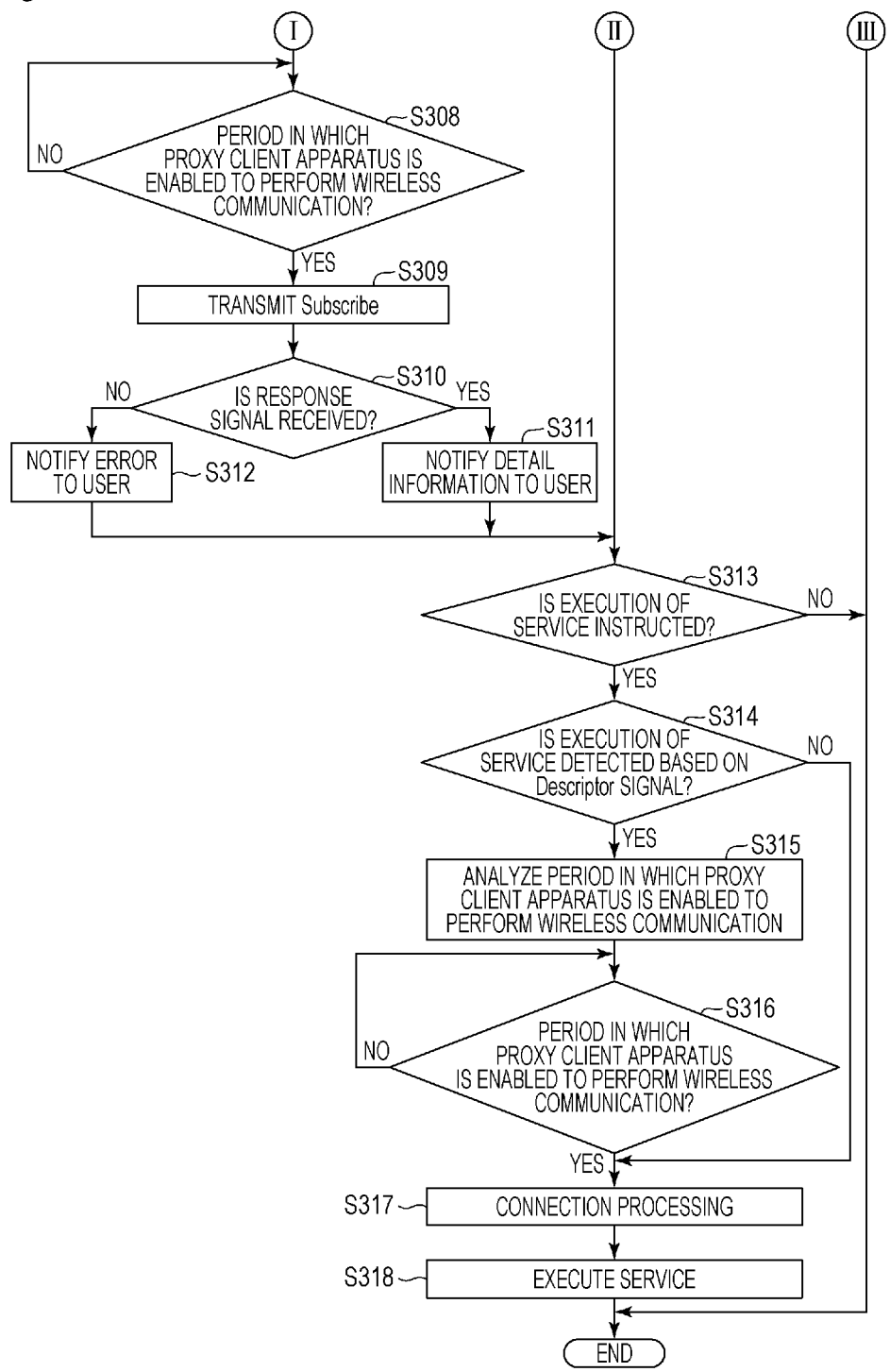

[Fig. 4]
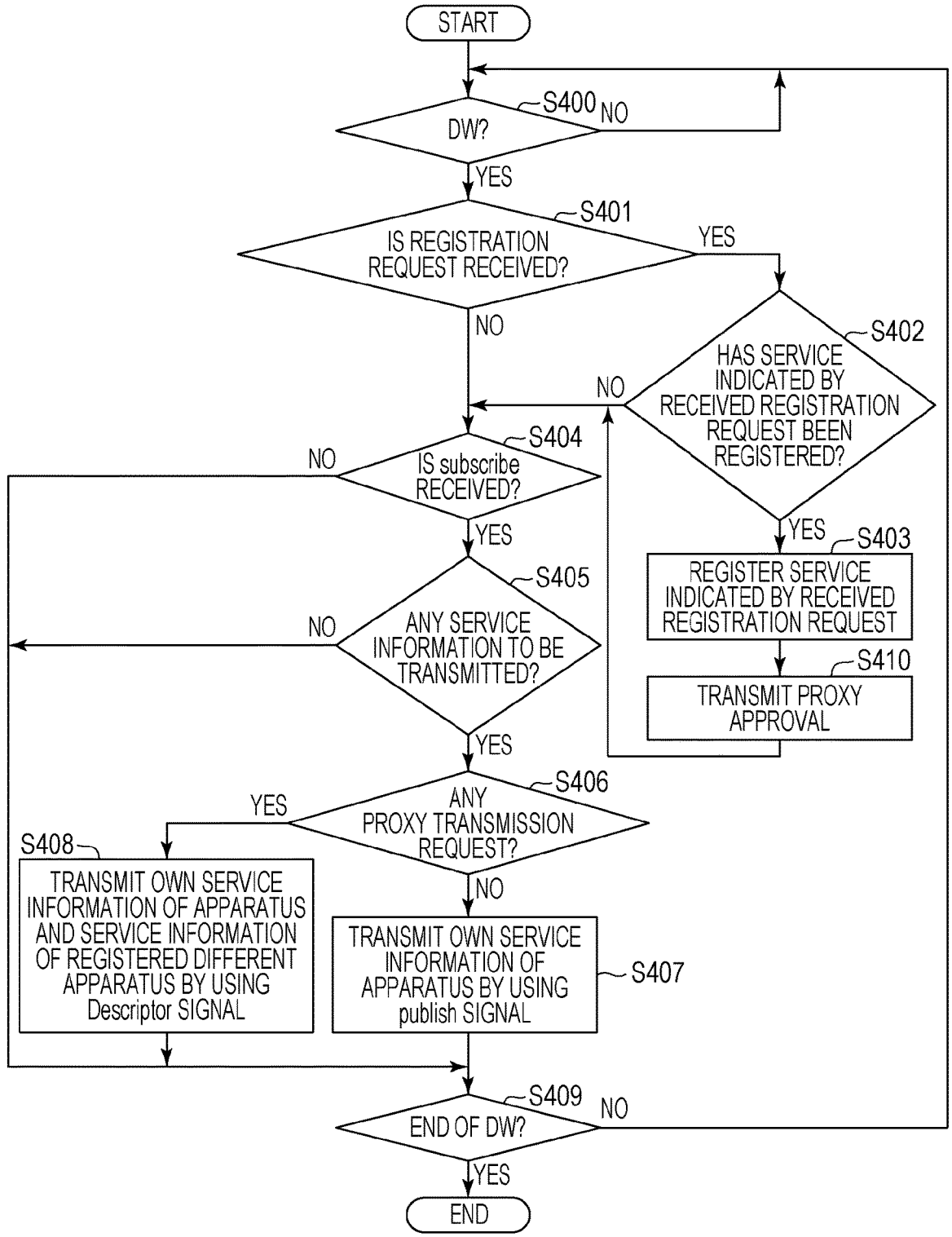

[Fig. 5]
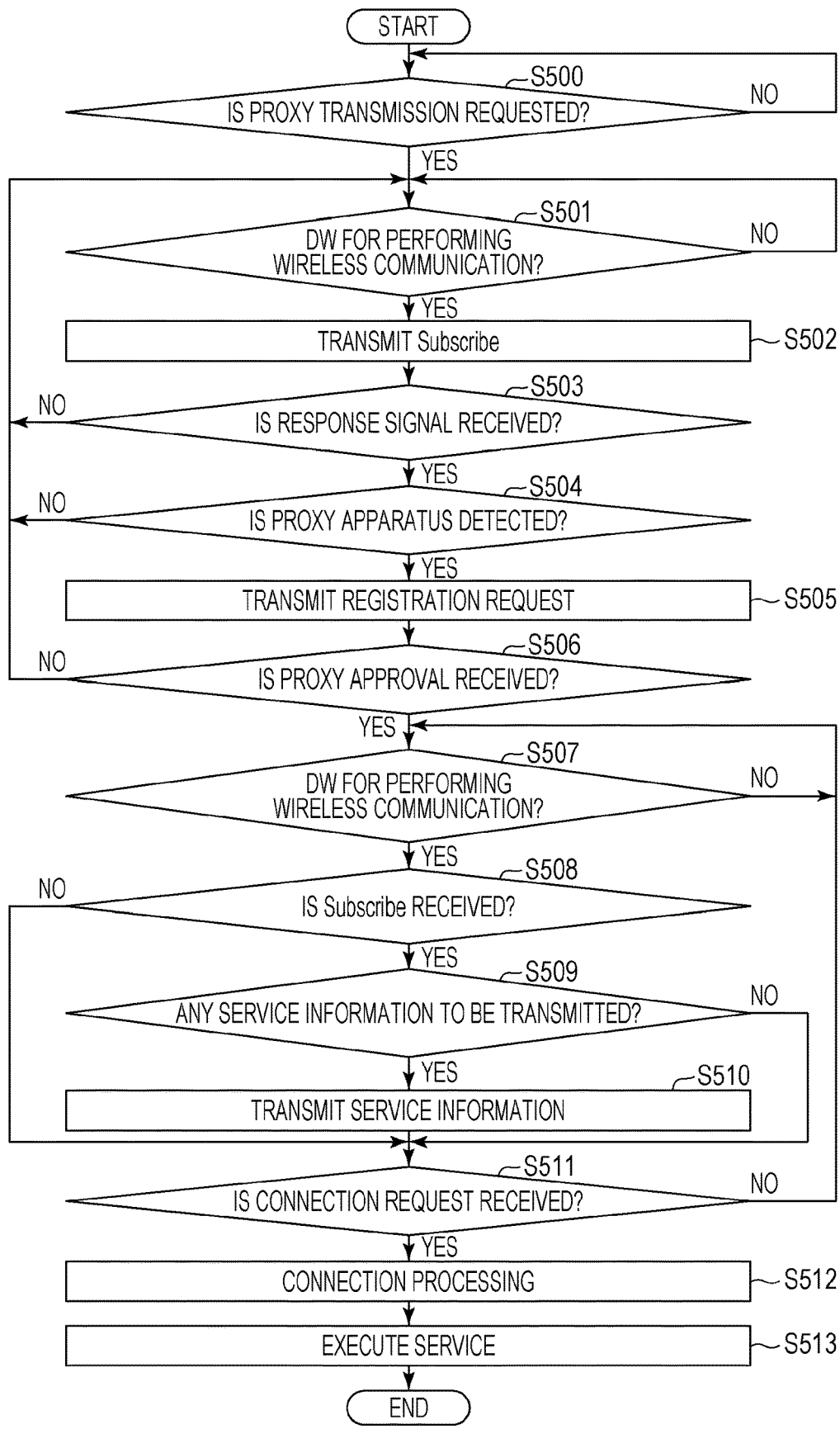

[Fig. 6]
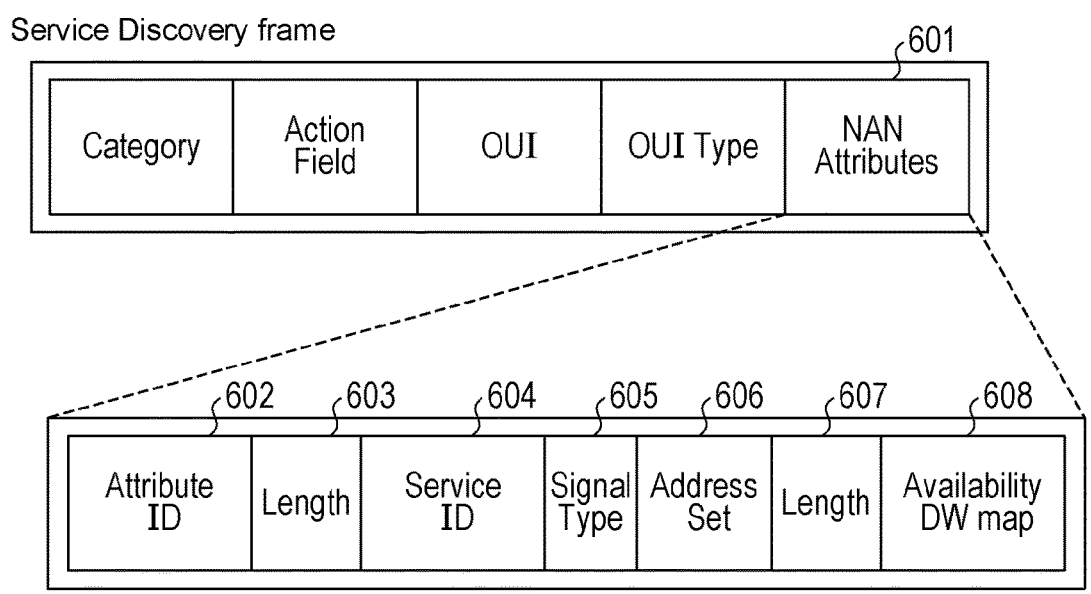

[Fig. 7]
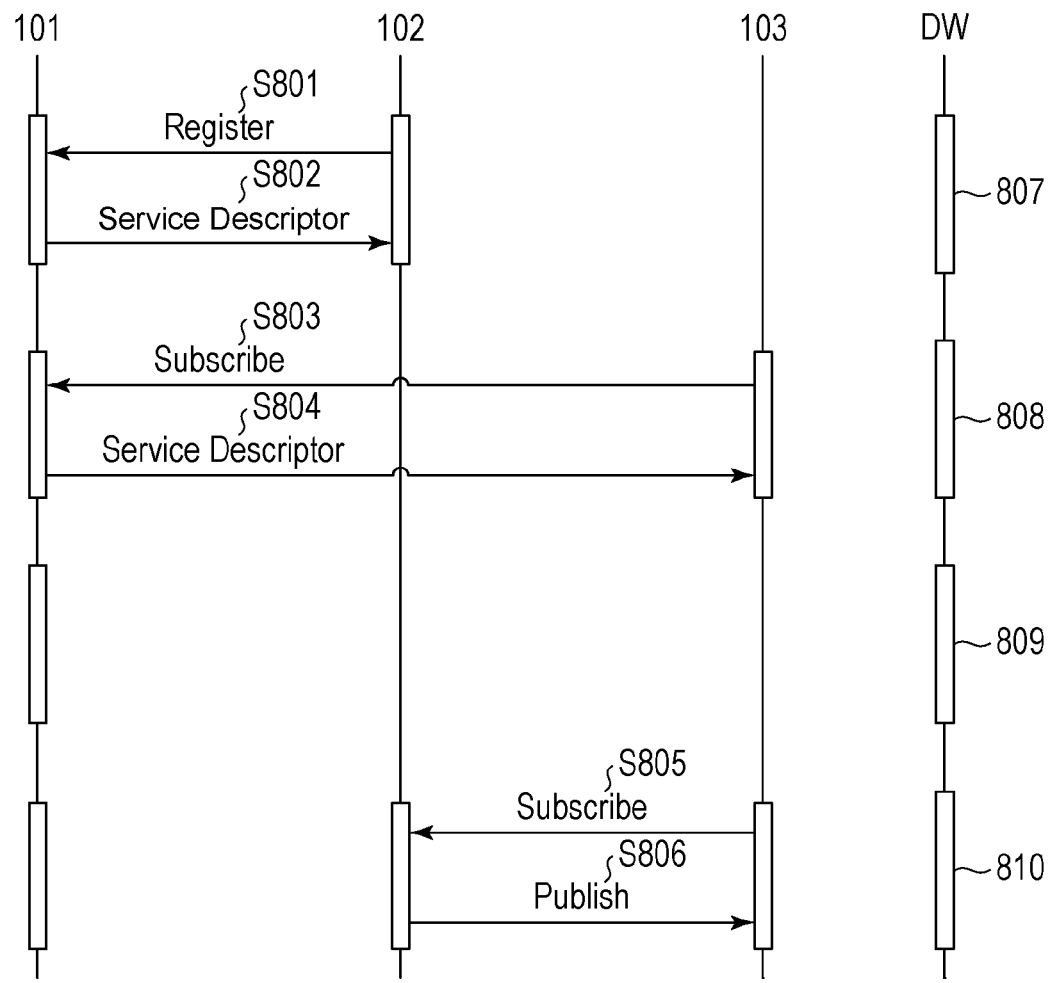

[Fig. 8]
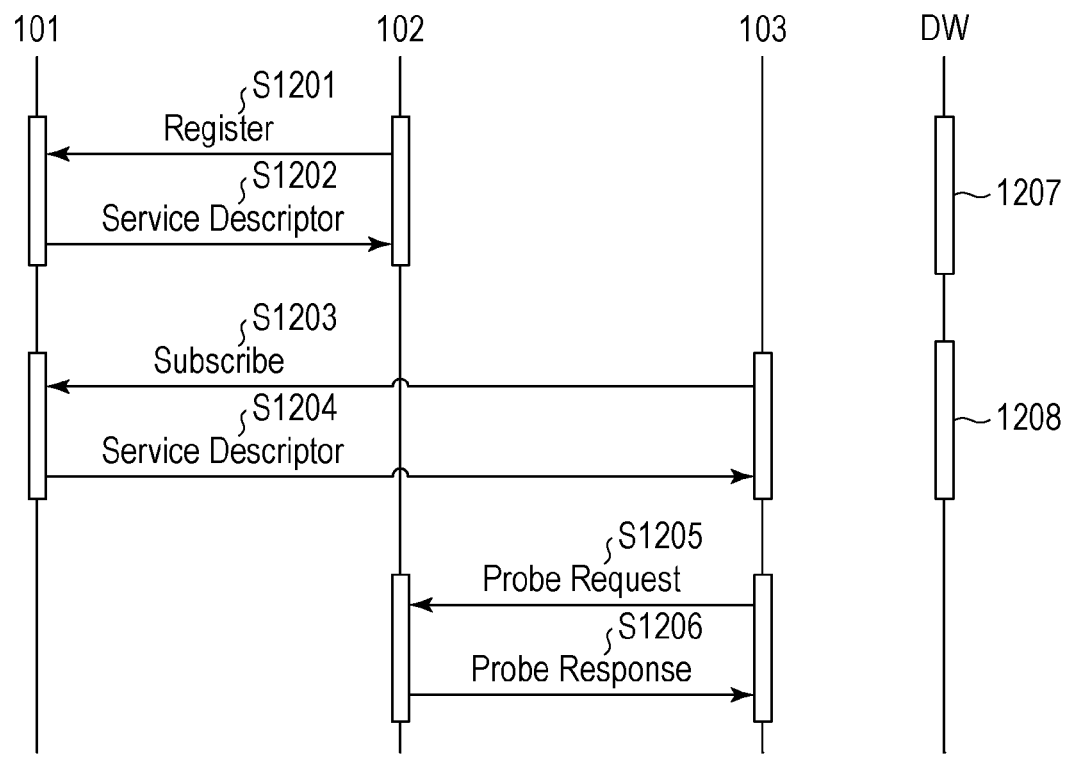

[Fig. 9]
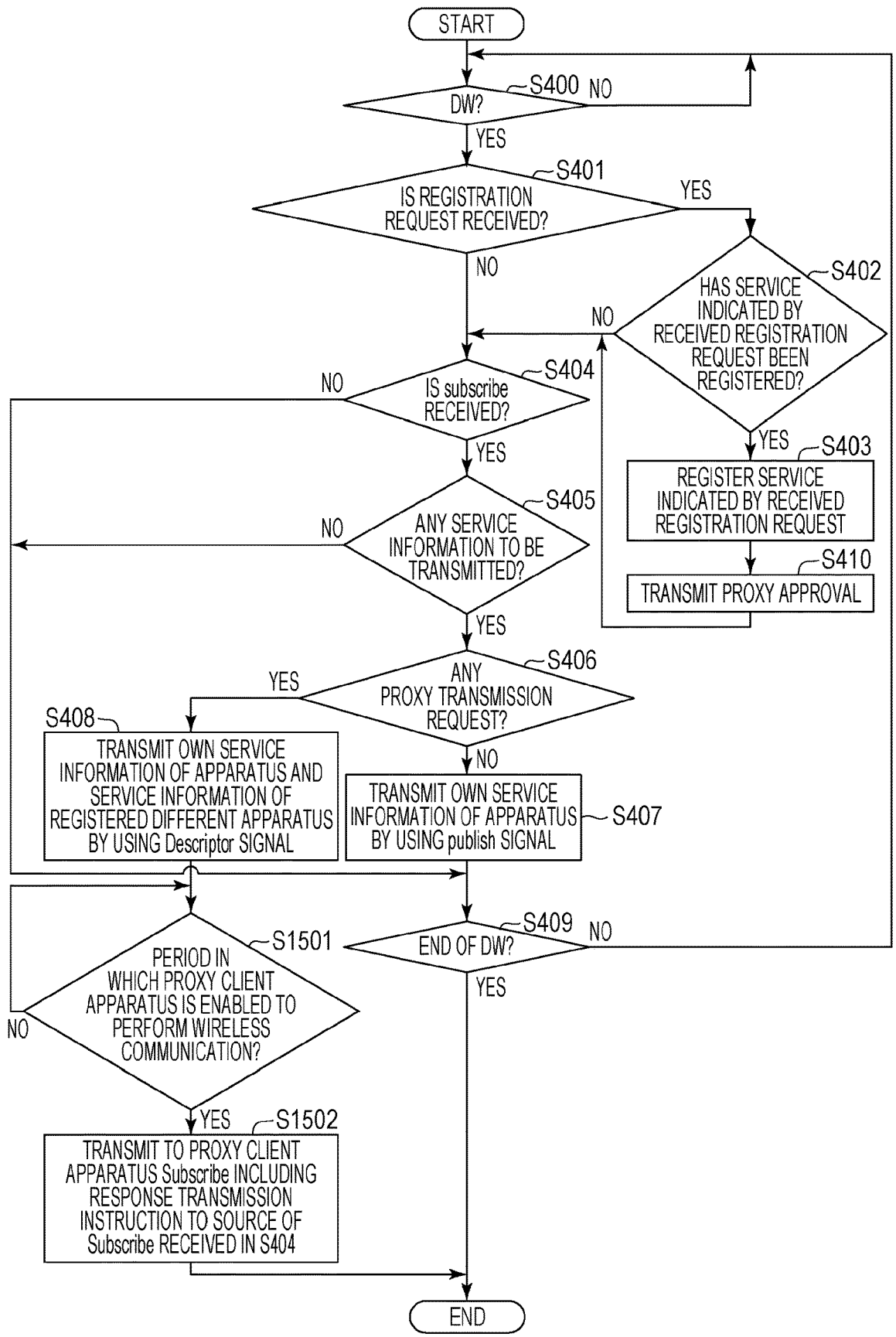

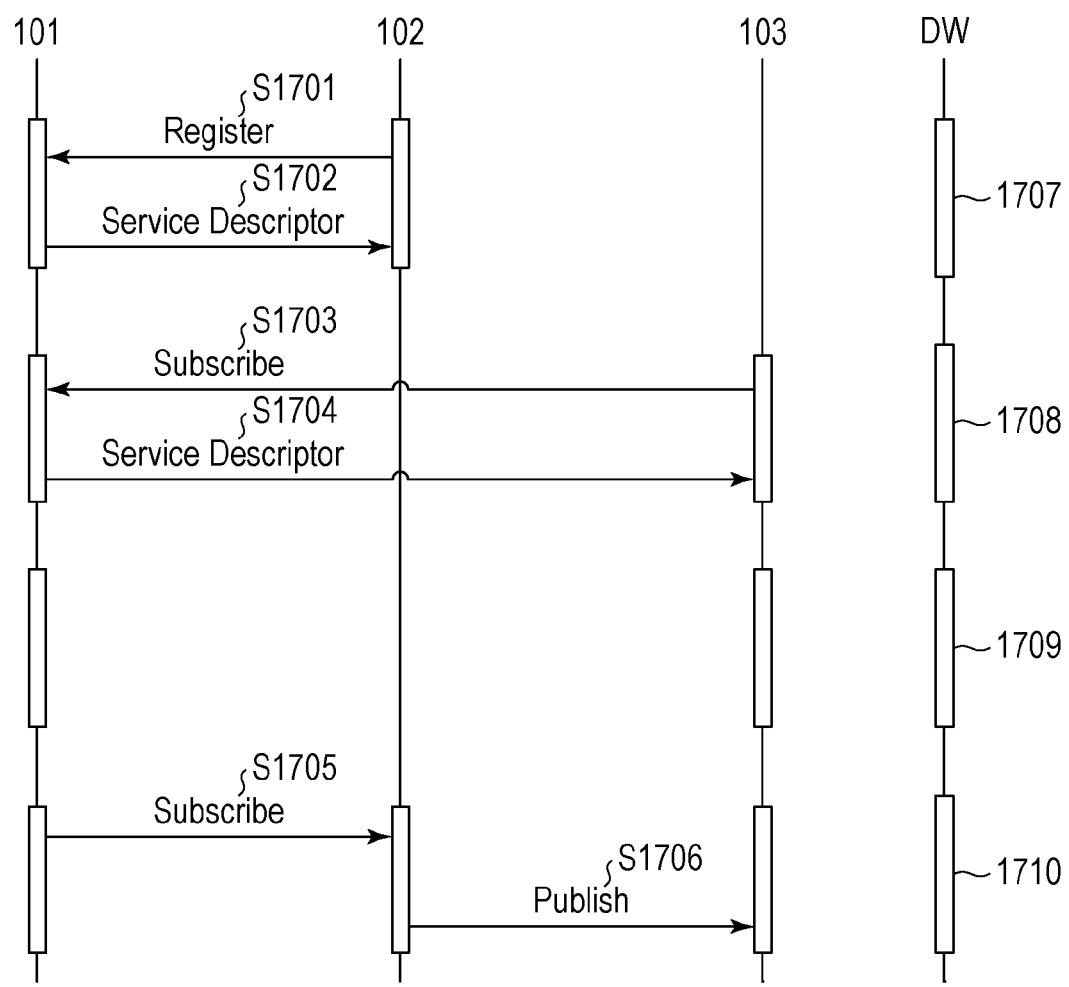
[Fig. 10]

[Fig. 11A]
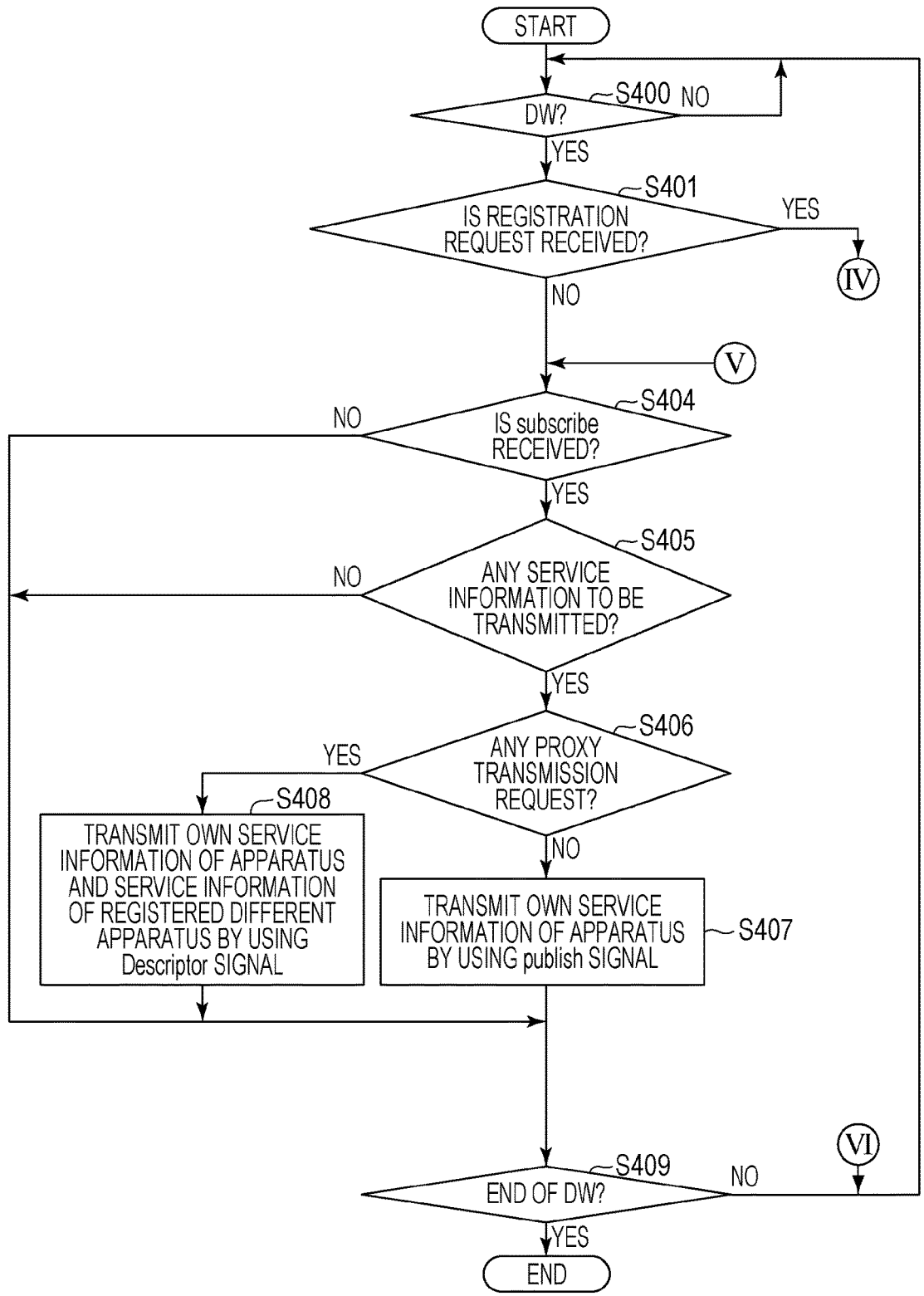

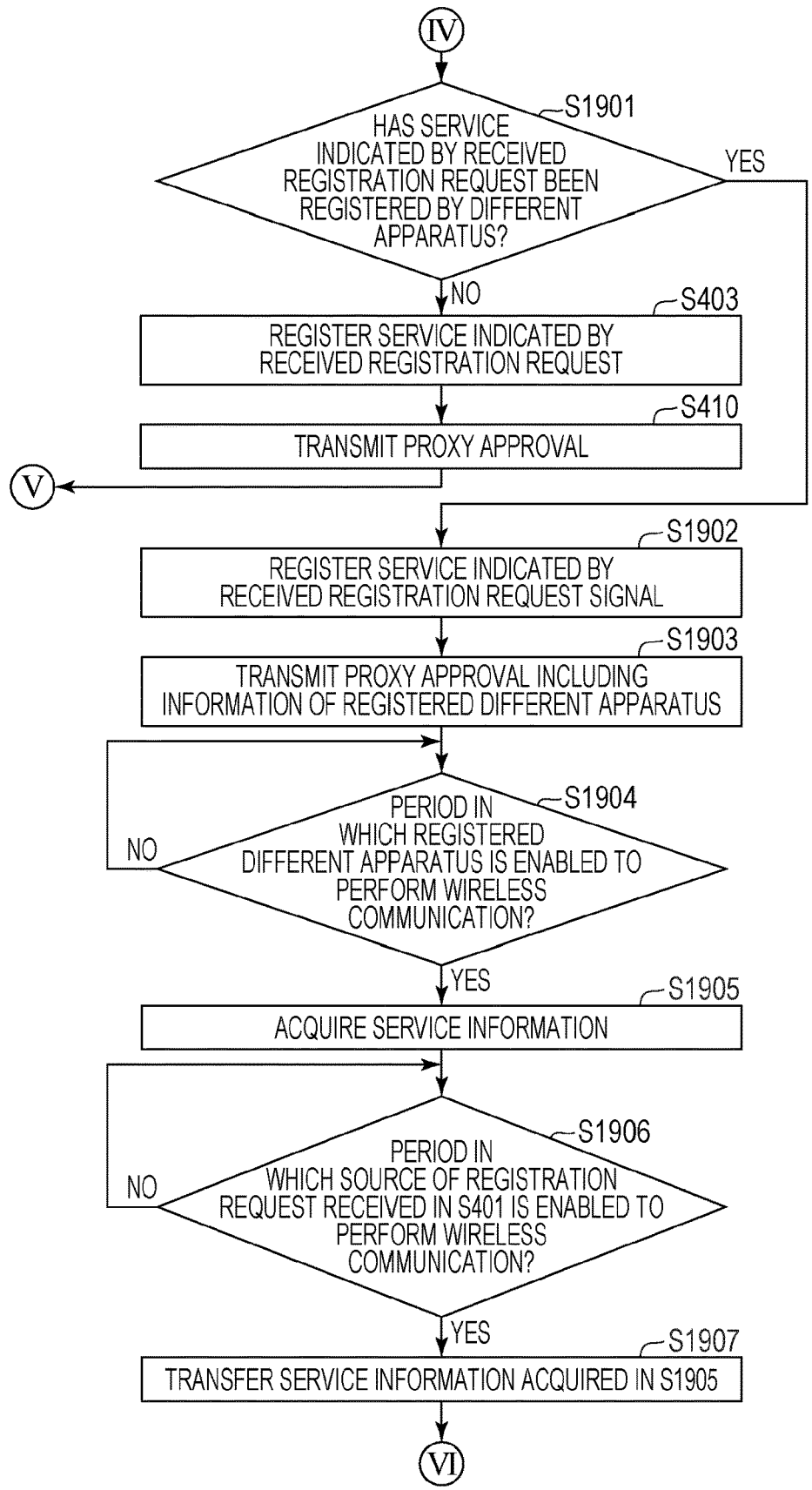
[Fig. 11B]

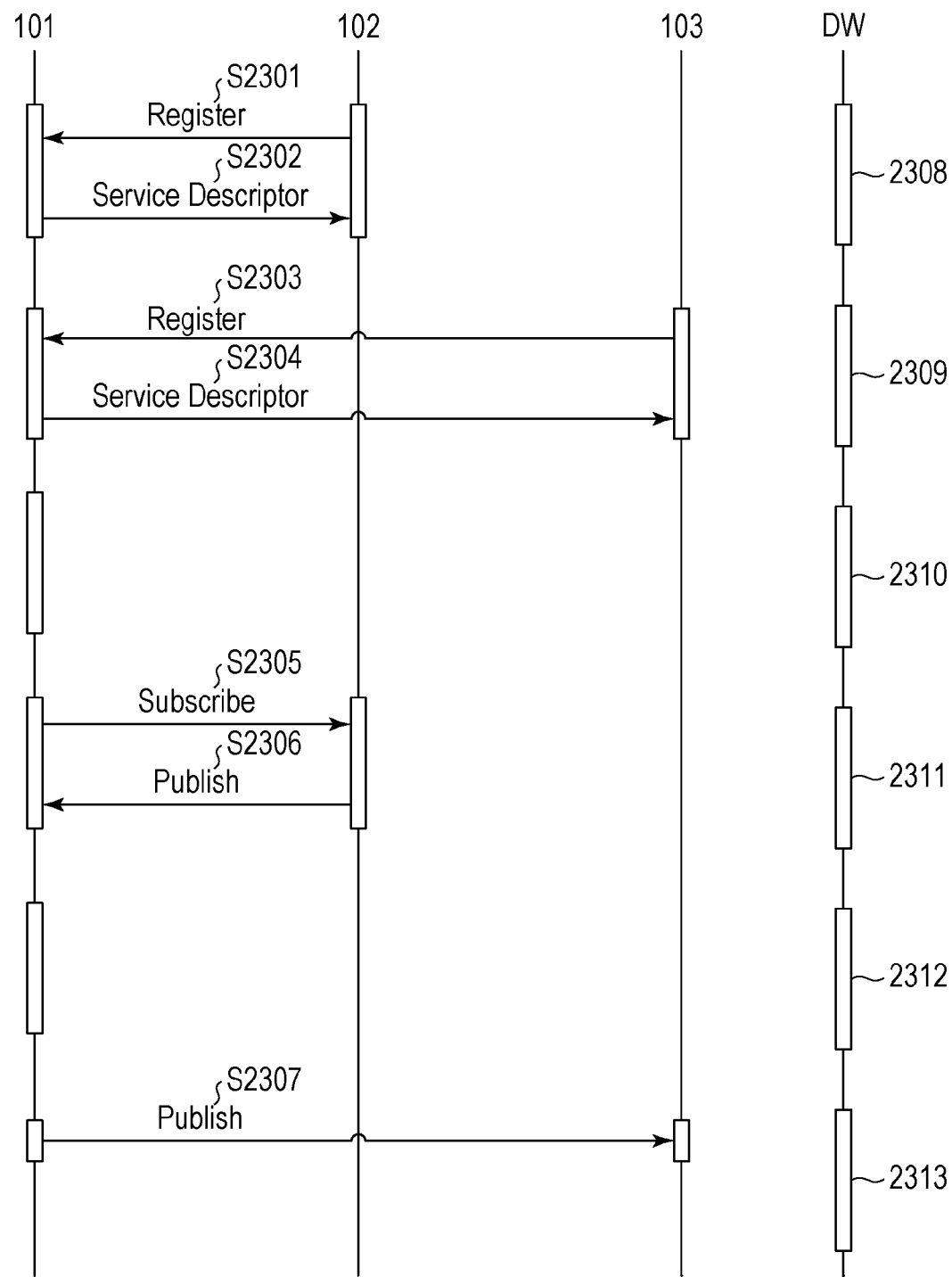
[Fig. 12]

COMMUNICATION APPARATUS, CONTROL METHOD AND NON-TRANSITORY COMPUTER-READABLE STORAGE MEDIUM

TECHNICAL FIELD

The present invention relates to a communication technology.

BACKGROUND ART

PTL 1 describes about NAN (Neighbor Awareness Networking) which is a standard defined by Wi-Fi Alliance for discovering a service executable by other apparatuses. PTL 1 discloses that, according to NAN, apparatuses communicate service information in a period determined based on a beacon signal. Each of the apparatuses communicates in a predetermined period and shifts to a sleep state in which wireless communication is not performed so that a service executable by other apparatuses can efficiently be discovered.

As described above, use of NAN allows efficient discovery of a service. However, when an apparatus which does not communicate service information among a plurality of apparatuses communicating according to NAN has a state ready for communication for NAN in predetermined periods in predetermined cycles, unnecessary processes and power consumption may possibly occur. Therefore, apparatuses which implement NAN are enabled to perform wireless communication for NAN in not all but a part of a predetermined period occurring in predetermined cycles. In this case, service information of a first apparatus enabled to perform wireless communication for NAN in not all but a part of a predetermined period occurring in predetermined cycles may not be acquired by another apparatus in a period in which the first apparatus is not enabled for wireless communication. A second apparatus which requests execution of a service in conjunction with the first apparatus may possibly transmit information for executing the service in a period when the first apparatus is not enabled to perform wireless communication to the first apparatus. This means that unnecessary information transmission is performed.

CITATION LIST

Patent Literature

PTL 1: U.S. Unexamined Patent Application Publication No. 2015/0036540, Specification

SUMMARY OF INVENTION

An aspect of the present invention provides a communication apparatus communicable in a system having a plurality of apparatuses including at least a proxy client apparatus, a proxy apparatus configured to transmit, by proxy, service information requested by the proxy client apparatus, and the communication apparatus, in which service information is communicated in a predetermined period when a beacon is transmitted or received, the period being repeatedly started in predetermined cycles, the communication apparatus including a receiving unit configured to receive service information in each of a plurality of predetermined periods started in the predetermined cycles, a determining unit configured to determine a period in which the proxy client apparatus is enabled to perform wireless communication among the plurality of predetermined periods based on information acquired from the proxy apparatus in a case where service information of the proxy client apparatus transmitted by the proxy apparatus by proxy is received by the receiving unit in at least some periods in which the proxy client apparatus does not communicate the service information of the plurality of periods, and a communicating unit configured to perform communication with the proxy client apparatus for executing a service described in the service information of the proxy client apparatus in the period determined by the determining unit in which the proxy client apparatus is enabled to perform wireless communication.

Another aspect of the present invention provides a communication apparatus communicable in a system having a plurality of apparatuses including at least a proxy client apparatus, the communication apparatus capable of transmitting by proxy service information requested by the proxy client apparatus, and another communication apparatus, in which service information is communicated in a predetermined period when a beacon is transmitted or received, the period being repeatedly started in predetermined cycles, the communication apparatus including a transmitting unit configured to transmit service information of the proxy client apparatus in a case where the service information is requested by the other communication apparatus in the predetermined period in which the proxy client apparatus does not communicate the service information, and an instructing unit configured to instruct the proxy client apparatus in another predetermined period started in the predetermined cycles in which the proxy client apparatus is enabled to perform wireless communication to perform communication for executing the service described in the service information together with the other communication apparatus in a case where the service information of the proxy client apparatus is transmitted from the transmitting unit to the other communication apparatus.

Further features of the present invention will become apparent from the following description of exemplary embodiments with reference to the attached drawings.

BRIEF DESCRIPTION OF DRAWINGS

FIG. 1 illustrates a configuration of a communication system.

FIG. 2 illustrates a configuration of a communication apparatus.

FIG. 3A is a flowchart illustrating operations to be performed by a terminal 103.

FIG. 3B is a flowchart illustrating operations to be performed by a terminal 103.

FIG. 4 is a flowchart illustrating operations to be performed by a terminal 101.

FIG. 5 is a flowchart illustrating operations to be performed by a terminal 102.

FIG. 6 illustrates a configuration of a frame used in an embodiment.

FIG. 7 illustrates a sequence of a communication system.

FIG. 8 illustrates a sequence of a communication system.

FIG. 9 is a flowchart illustrating operations to be performed by the terminal 101.

FIG. 10 illustrates a sequence of a communication system.

FIG. 11A is a flowchart illustrating operations to be performed by a communication apparatus.

FIG. 11B is a flowchart illustrating operations to be performed by a communication apparatus.

FIG. 12 illustrates a sequence of a communication system.

DESCRIPTION OF EMBODIMENTS

According to an embodiment, an apparatus which acquires service information can acquire service information of another apparatus even in a period in which the other apparatus is not enabled to perform wireless communication and performs a communication for executing a service in a period in which the other apparatus is enabled to perform wireless communication.

An example applying a wireless LAN system based on a NAN standard will be described below. According to NAN, service information is communicated in a period called a Discovery Window (hereinafter, called a DW). A DW is a time period and a channel in which a plurality of devices executing NAN is converged. Such a set of terminals sharing a DW schedule will be called a NAN cluster. A DW occurs in predetermined cycles.

Each of terminals belonging to a NAN cluster operates by playing one role of Master, Non-Master Sync and Non-Master Non-Sync. A terminal operating as a Master transmits a Synchronization Beacon (hereinafter, called a Sync Beacon being a beacon by which terminals can identify a DW and synchronize with it. The terminal operating as a Master transmits a Discovery Beacon being a signal for causing a terminal not belonging to the NAN cluster to recognize the NAN cluster. Such a Discovery Beacon may be transmitted every 100 ms, for example, in a period excluding a DW period. In each NAN cluster, at least one terminal operates as a Master.

A terminal operating as a Non-Master Sync transmits a Sync Beacon but does not transmit a Discovery Beacon. A terminal operating as a Non-Master Non-Sync does not transmit either Sync Beacon or Discovery Beacon.

Terminals participating in the NAN cluster synchronize with a DW period occurring in predetermined cycles in response to a Sync Beacon and communicate service information in the DW period.

The terminals mutually communicate with each other a Subscribe signal being a signal for discovering or requesting a service in a DW period and a Publish signal being a signal for notifying that a service is available. The terminals can further exchange a Follow-up signal usable for exchanging additional information regarding the service in a DW period. The Publish, Subscribe, and Follow-up signals may collectively be called a Service Discovery Frame (SDF). The terminals can exchange an SDF to discover or detect a service.

FIG. 1 illustrates a network configuration example according to this embodiment.

Terminals 101, 102 and 103 are communication apparatuses which communicate based on a NAN standard. Terminals 101 to 103 can discover and provide a neighboring communication apparatus and a service available from it based on the NAN standard. The terminals 101 to 103 are participating in an identical NAN cluster. Terminals participating in the NAN cluster may communicate in 6 ch (2.437 GHz) of a 2.4 GHz frequency band. In the NAN cluster, a 16-TU (Time Unit) DW is provided every 512 TUs. In other words, in the NAN cluster, 16-TU DW is provided repeatedly every 512 TUs. The terminals participating in the NAN cluster synchronize their DW schedules in response to a Sync Beacon transmitted and received in a DW. In this case, 1 TU is equal to 1024 μsec. Terminals belonging to the NAN cluster communicate service information by using the SDF in a DW period.

The terminal 101 operates as a Proxy Server (proxy apparatus) in the NAN cluster. When a proxy apparatus is requested by a Proxy Client (proxy client apparatus) to transmit service information by proxy, the Proxy Client transmits service information of the proxy client apparatus by proxy. The proxy apparatus acquires information regarding a type of a service and a period in which wireless communication is enabled from the proxy client apparatus. When the proxy apparatus receives information for searching a service in a period in which the proxy client apparatus is disabled to perform wireless communication, the proxy apparatus transmits the service information of the proxy client apparatus by proxy.

The proxy apparatus may use a frame called a Descriptor signal to transmit service information of the proxy client apparatus. The Descriptor signal contains information regarding the type of a service executable by the proxy client apparatus and a period in which the proxy client apparatus is enabled to perform wireless communication.

The terminal 102 operates as a proxy client apparatus in the NAN cluster. The terminal 102 operates in an awake state in which wireless communication is enabled in a partial period of DWs defined in the NAN cluster and operates in a sleep state in which wireless communication is disabled in the other DWs. In this case, less power is consumed in the sleep state than that in the awake state. Each terminal does not supply power to a communicating unit 206, for example, in the sleep state and supplies power to the communicating unit 206 in the awake state. In other words, because power is supplied to the communicating unit 206 in the awake state, power consumption is increased more than the sleep state though communication is enabled.

The terminal 103 transmits a Subscribe signal being a service search request signal for searching a service available from another apparatus participating in the NAN cluster and operates as a Subscriber.

The terminals 101 to 103 may operate by playing different roles from each other. For example, the terminal 103 may operate as a Publisher which transmits a Publish signal being a service supply signal for supplying a service.

Next, a hardware configuration of the terminals 101 to 103 will be described with reference to FIG. 2. FIG. 2 illustrates a hardware configuration of the communication apparatus 200 (terminals 101 to 103).

A storage unit 201 is configured by a memory such as a ROM and a RAM and stores programs for executing operations, which will be described below, and information such as communication parameters for wireless communication. The storage unit 201 may be, instead of a memory such as a ROM and a RAM, a storage medium such as a flexible disk, a hard disk, an optical disk, a magneto-optical disk, a CD-ROM, a CD-R, a magnetic tape, a non-volatile memory card, and a DVD. The storage unit 201 may include a plurality of memories, for example.

A control unit 202 may be configured by a processor such as a CPU and an MPU and execute a program stored in the storage unit 201 to generally control the communication apparatus 200. The control unit 202 may include a plurality of multicore processors, for example, and the plurality of processors may generally control the communication apparatus 200.

The control unit 202 controls a function unit 203 to execute a predetermined process such as imaging, printing, and projecting. The function unit 203 is a hardware used by the communication apparatus 200 to execute a predetermined process. For example, in a case where the communication apparatus 200 is a camera, the function unit 203 is an imaging unit and performs an imaging process. For example, in a case where the communication apparatus 200 is a printer, the function unit 203 is a print unit and performs a printing process. For example, in a case where the communication apparatus 200 is a projector, the function unit 203 is a projecting unit and performs a projecting process. Data to be processed by the function unit 203 may be data stored in the storage unit 201 or may be data communicated with another communication apparatus through the communicating unit 206, which will be described below.

An input unit 204 receives an operation performed by a user. An output unit 205 presents an output to a user. In this case, the output from the output unit 205 as described above may include at least one of a presentation on a screen, an audio output from a speaker, and an vibration output. It should be noted that both of the input unit 204 and the output unit 205 may be implemented by one module such as a touch panel. The output unit 205 may be configured by an LCD or an LED, for example, if it outputs a display presentation and may output information visibly recognizable by a user for display control over user interfaces, for example.

The communicating unit 206 may be configured by a chip for executing communication based on IEEE (Institute of Electrical and Electronic Engineers) 802.11 series. The communicating unit 206 may control wireless communication and control IP communication. The communicating unit 206 may control an antenna 207 to transmit and receive wireless signals for wireless communication. The communication apparatus 200 communicates contents such as image data, document data, and video data with another communication apparatus through the communicating unit 206.

Operations of a communication system having the configuration as described above will be described. According to this embodiment, a terminal which acquires from a proxy apparatus a DW being a period when a proxy client apparatus is enabled to perform wireless communication communicates with the proxy client apparatus in the period (DW).

Operations of the terminal 101 in a case where the terminal 101 operates as a proxy apparatus and transmits by proxy service information of a proxy client apparatus will be described with reference to a flowchart illustrated in FIG. 4. The flowchart illustrated in FIG. 4 is started in response to a start of a DW of the NAN cluster to which the terminal 101 belongs. The flowchart illustrated in FIG. 4 is implemented by execution of a control program stored in the storage unit 201 and execution of arithmetic operations and modifications on information and control over hardware by the control unit 202 in the terminal 101. Some or all of steps in the flowchart illustrated in FIG. 4 may be configured to be implemented by hardware such as an ASIC.

The terminal 101 determines whether a DW period has started or not (S400) and, if so, determines whether a Register signal being a registration request signal for requesting to register service information is received from the proxy client apparatus or not (S401). It may be said that the registration request signal is a signal for requesting proxy transmission of service information. If the registration request is received from the proxy client apparatus, the terminal 101 determines whether a service indicated by the received registration request has already been registered or not (S402). The terminal 101 identifies the identification information of the proxy client apparatus and the type of service requested by the proxy client apparatus to transmit by proxy based on the information included in the proxy received registration request. The terminal 101 then determines whether the identified identification information of the proxy client apparatus and the type of service have already been registered.

If it is determined in S402 that the service indicated by the received registration request has already been registered, the terminal 101 advances the processing to S404, which will be described below. On the other hand, if it is determined in S402 that the service indicated by the received registration request has not already been registered, the terminal 101 registers the service indicated by the received registration request as a service to be transmitted by proxy (S403). A Register signal being the registration request received in S401 includes information regarding a DW in which the source proxy client apparatus performs wireless communication, and the terminal 101 also registers the information. The terminal 101 executes the proxy functionality and transmits a proxy approval indicating that the service information has been registered to the source proxy client apparatus of the registration request (S410). The terminal 101 may designate a period for performing wireless communication to the proxy client apparatus.

Next, the terminal 101 determines whether a Subscribe signal has been received or not (S404) where the Subscribe signal is a signal for discovering or requesting a service during a DW period. If the Subscribe signal has been received, the terminal 101 determines whether any service information to be transmitted exists or not based on the received Subscribe signal (S405). If it is determined in S405 that the received Subscribe signal designates the requested service, for example, whether the terminal 101 supports the service or not and whether any service designated as a service of the registered proxy client apparatus exists or not. The terminal 101 determines that some service information to be transmitted exists if the designated service corresponds to a service of the terminal 102 or a registered proxy client apparatus. If the received Subscribe signal does not designate a service to be requested, the terminal 101 determines that some service information to be transmitted exists.

If it is determined in S405 that some service information to be transmitted exists, the terminal 101 determines whether the received Subscribe signal includes information for requesting to transmit the service information of the proxy client apparatus or not (S406). The information for requesting to transmit service information of the proxy client apparatus may be entered to a Service Control Field of the Subscribe signal. Alternatively, it may be entered to Matching Filter or Service Info. The information for requesting to transmit service information of the proxy client apparatus may be communicated in a frame different from that of the Subscribe signal.

If the information for requesting to transmit service information of the proxy client apparatus is not included, the terminal 101 uses a publish signal to transmit service information of the terminal 101 including service information describing that the terminal 101 can operate as a proxy apparatus, for example (S407). The terminal 101 may transmit a beacon including information describing that it can operate as a proxy apparatus if the terminal 101 plays a role for transmitting a beacon signal. The terminal 101 may periodically transmit a publish signal indicating that it can operate as a proxy apparatus.

On the other hand, if it is determined in S406 that the information for requesting to transmit service information of the proxy client apparatus is included, the terminal 101 uses a Descriptor signal to transmit service information of the terminal 101 and service information of a different registered apparatus (S408). In S408, the terminal 101 may transmit service information of the different registered apparatus without transmitting the service information of the terminal 101.

If the DW has not ended, the terminal 101 executes the processing in S400 again. When the DW ends, the processing ends.

Next, operations to be performed by the terminal 102 which operates as a proxy client apparatus and executes a service in conjunction with a different apparatus which operates as a Subscriber will be described with reference to a flowchart illustrated in FIG. 5. The flowchart illustrated in FIG. 5 is started when the terminal 102 requests a proxy apparatus to transmit service information by proxy. The flowchart illustrated in FIG. 5 may be implemented by execution of a control program stored in the storage unit 201 and execution of arithmetic operations and processing on information and control over hardware by the control unit 202 in the terminal 102. Some or all of steps illustrated in the flowchart in FIG. 4 may be implemented by hardware such as an ASIC.

The terminal 102 determines whether proxy transmission of service information is requested or not (S500), and, if so, determines whether a DW for performing wireless communication by the terminal 102 has started or not (S501). The terminal 102 may not operate in an awake state in which it can perform wireless communication in all DWs but may be shifted to an awake state in every other DW or DWs after several DWs, for example. Therefore, the terminal 102 determines whether a DW to shift to the awake state has started or not. The terminal 102 may keep the awake state in all DWs until a request for proxy transmission of service information has succeeded.

When a DW in which the terminal 102 performs wireless communication, the terminal 102 transmits a Subscribe signal for detecting a proxy apparatus (S502). The terminal 102 determines whether a Publish signal being a response signal to the transmitted Subscribe signal has been received or not (S503). The terminal 102 determines whether any proxy apparatus exists or not based on the received response signal (S504). If a plurality of proxy apparatuses is detected, one of them may be selected based on information such as Master Rank of proxy apparatuses or a user's operation or may request proxy transmission to the plurality of proxy apparatuses. The Master Rank is information usable for determining an apparatus for operating as a Master in the NAN cluster.

Having described that the terminal 102 detects a proxy apparatus based on a received Publish signal, the terminal 102 may detect a proxy apparatus based on a received beacon signal such as a Sync Beacon or a Discovery Beacon. In this case, the beacon signal is assumed to include identification information of an apparatus to operate as a proxy apparatus. When the proxy apparatus is responsible for transmitting a beacon signal, the proxy apparatus may transmit a beacon including information describing that it is operating as a proxy apparatus.

If the terminal 102 in S504 detects a proxy apparatus, the terminal 102 transmits a registration request (Register signal) to request registration and proxy transmission of service information to the detected proxy apparatus (S505). The registration request to be transmitted in S505 includes information indicating a DW in which the terminal 102 performs wireless communication. After transmitting the registration request, the terminal 102 execute the proxy functionality and determines whether a proxy approval indicating that the service information has been registered is received from the proxy apparatus or not (S506).

If the proxy approval is received, the terminal 102 recognizes that the request for the proxy transmission has been succeeded and advances the processing. The terminal 102 repeats the processing in S500 to S506 until the request for proxy transmission is succeeded.

If the request for proxy transmission is succeeded, the terminal 102 determines whether a DW in which the terminal 102 performs wireless communication again has started or not (S507). If a DW starts in which the terminal 102 performs wireless communication, the terminal 102 determines whether a Subscribe signal has been received or not (S508). If a Subscribe signal has been received, the terminal 102 determines whether any service information to be transmitted exists or not based on the received Subscribe signal (S509). When the received Subscribe signal designates a requested service, for example, the determination in S509 determines whether the terminal 102 supports the service or not. If the received Subscribe signal does not designate a requested service, the terminal 102 determines that some service information to be transmitted exists.

If it is determined in S509 that some service information to be transmitted exists, the terminal 102 uses a publish signal to transmit service information including service information executable by the terminal 102 (S510). The terminal 102 determines whether a connection request for establishing a connection for executing the service has been received (S511). The connection request may be a probe request or an association request, for example. The connection request may be information for executing a Wi-Fi Direct (registered trademark).

If the connection request has not been received, the terminal 102 performs the processing from S507 again. If the connection request has been received, the terminal 102 executes a connection process for Wi-Fi Direct (registered trademark), for example (S512) and executes the service by using a wireless correction established by the connection process (S513). The service to be executed in S513 may be a printing service for printing an image communicated between apparatuses, for example. The service to be executed in S513 may be an image sharing service for sharing an image between apparatuses, for example.

Next, operations to be performed by the terminal 103 which operates as a Subscriber executing a service together with a proxy client apparatus based on the service information of the proxy client apparatus acquired from the proxy apparatus will be described with reference to FIGS. 3A and 3B. The flowchart illustrated in FIGS. 3A and 3B is started when the terminal 103 receives an instruction to search a service (or service search information) from a user. The flowchart illustrated in FIGS. 3A and 3B is implemented by execution of a control program stored in the storage unit 201 and execution of arithmetic operations and modifications on information and control over hardware by the control unit 202 in the terminal 103. Some or all of steps in the flowchart illustrated in FIGS. 3A and 3B may be configured to be implemented by hardware such as an ASIC.

The terminal 103 determines whether any service search instruction has been received by the input unit 204 or not (S300). If some service search instruction has been received in S300, the terminal 103 waits until a DW period of the NAN cluster in which the terminal 103 is participating starts (S301). The terminal 103 transmits a Subscribe signal when the DW period of the NAN cluster in which it is participating starts (S302).

The Subscribe signal transmitted in S303 includes information for requesting transmission of service information of a proxy client apparatus to a proxy apparatus.

The terminal 103 determines whether a response signal has been received or not after transmitting the Subscribe signal (S303). If the terminal 103 determines in S303 that a response signal has not been received, the terminal 103 notifies a user through the output unit 205 of that no executable service has been detected (S319). Then, the processing ends.

On the other hand, if the terminal 103 determines in S303 that a response signal has been received, the terminal 103 determines whether a service described by the service information included in the response signal is executable or not (S304). If the terminal 103 detects an executable service in S304, the terminal 103 notifies that an executable service has been detected to a user through the output unit 205 (S305). In S305, the information for identifying a service and identification information of a different apparatus which can execute the service are notified to a user through the output unit 205.

Next, if the executable service is detected in S304 based on a Descriptor signal for transmitting service information of the proxy client apparatus, which has been transmitted from the proxy apparatus, the terminal 103 executes the processing in S306. In S306, the terminal 103 determines whether detail information regarding the service detected based on the Descriptor signal is to be acquired or not. The Descriptor signal does not include detail information of a service, unlike the Publish signal. The detail information of a service may include a paper size and color information (such as grayscale printing or color printing), for example, as information regarding a printing service. The detail information of a service may include an image size, a resolution positional information, and information regarding the name or date of image data as information regarding the image sharing service, for example.

If it is determined in S306 that detail information regarding the service detected based on the Descriptor signal is to be acquired, the terminal 103 analyzes a period in which the proxy client apparatus can perform wireless communication based on the Descriptor signal (S307, where the Descriptor signal includes information describing a DW in which wireless communication is performed by the proxy client apparatus).

The terminal 103 waits until a period starts (S308) in which the proxy client apparatus is enabled to perform wireless communication, which is analyzed in S306. When the period analyzed in S306 starts in which the proxy client apparatus is enabled to perform wireless communication, the terminal 103 transmits a Subscribe signal to the proxy client apparatus (S309). After transmitting the Subscribe signal to the proxy client apparatus, the terminal 103 determines whether a Publish signal being a response signal has been received from the proxy client apparatus or not (S310).

If the terminal 103 receives a Publish signal from the proxy client apparatus, detail information on a service included in the Publish signal is notified to a user through the output unit 205 (S311). On the other hand, if the terminal 103 does not receive a Publish signal from the proxy client apparatus, an error is notified to a user through the output unit 205 (S312).

If an executable service is notified to a user in S305, the terminal 103 determines whether a service execution instruction is received through the input unit 204 or not (S313). If a service execution instruction is not received through the input unit 204, the terminal 103 finishes the processing.

If a service execution instruction is not received through the input unit 204, the terminal 103 determines whether the received execution instruction is an execution instruction for the service detected based on the Descriptor signal or not (S314). If it is determined in S314 that it is not an execution instruction for the service detected based on the Descriptor signal, that is, it is an execution instruction for the service detected based on the Publish signal, the processing moves to S317, which will be described below.

On the other hand, if it is determined in S314 that it is an execution instruction for the service detected based on the Descriptor signal, the terminal 103 analyzes a period in which a proxy client apparatus for executing the service is enabled to perform wireless communication (S315). The processing in S315 is performed in the same manner as the processing in S307.

The terminal 103 waits until start of the period analyzed in S315 in which the proxy client apparatus is enabled to perform wireless communication (S316). When the period analyzed in S315 starts in which the proxy client apparatus is enabled to perform wireless communication, the processing in S317 is executed. The terminal 103 transmits a connection request for establishing a connection for executing a service and executes processing for establishing wireless connection by performing Wi-Fi Direct (registered trademark), for example (S317). The connection request may be a probe request or an association request, for example. The connection request may be information usable for executing Wi-Fi Direct (registered trademark).

The terminal 103 executes a service by using the wireless connection established by the connection process in S317 (S318). The service to be executed in S318 may be a printing service for printing an image communicated between apparatuses, for example. The service to be executed in S318 may be an image sharing service for sharing an image between apparatuses, for example.

FIG. 6 illustrates a frame configuration example of a Descriptor signal or a Register signal being a Service discovery frame (SDF). The SDF may be a Public Action Frame based on IEEE802.11. The SDF includes a NAN Attribute (601) for including information defined according to NAN in a part of the Publish Action Frame. A unique value indicative of a Descriptor signal or a Register signal is entered to an Attribute ID (602) indicative of the type of an information element. As an example, 0x0E is input to the Attribute ID for a Descriptor signal. A Length (603) indicates a frame length.

Information describing the type of service is input to a Service ID (604). Information describing whether a service is to be advertised or to be searched is input to a Signal Type (605).

Identification information (such as a Mac address) of a proxy client apparatus is input to an Address Set (606). The identification information may be a bloom filter. Information indicating a DW for performing wireless communication of the proxy client apparatus is input to an Availability DW map (608). Information indicating which number is the DW in which the proxy client apparatus is enabled to perform wireless communication with reference to DW0 defined according to NAN is input to an Availability DW map (608). Length (607) indicates a field length of the Availability DW map (608).

A sequence to be performed by a communication system according to this embodiment will be described with reference to FIG. 7 in a case where the terminal 103 operating as a Subscriber acquires from the terminal 102 detail information of service information of the terminal 102 being a proxy apparatus, which is transmitted by the terminal 102 by proxy.

FIG. 7 illustrates DWs 807, 808, 809 and 810 of a NAN cluster. It is assumed that the terminal 102 has an awake state in the DW 807 and DW 810 while having a sleep state in the other DWs. The terminal 102 transmits a Register signal for requesting proxy transmission of service information to the terminal 101 (S801).

The terminal 101 registers service information included in a received Register signal. The terminal 101 notifies that the service information has been registered and that proxy transmission has been started to the terminal 102 by using a Descriptor signal (S802).

The terminal 103 receives a service search instruction and transmits a Subscribe signal (S803). Because the terminal 102 has the sleep state, the terminal 102 does not receive the Subscribe signal transmitted from the terminal 103 in S803.

If the terminal 101 receives the Subscribe signal from the terminal 103, the terminal 101 transmits a Descriptor signal including the service information of the terminal 102 (S804). The terminal 103 analyzes a period in which the terminal 102 is enabled to perform wireless communication from a content of the Descriptor signal. After that, a period of the DW 808 starts in which the terminal 102 is however not enabled to perform wireless communication. Therefore, the terminal 103 does not transmit a signal to the terminal 102.

When a period of the DW 808 starts in which the terminal 102 is enabled to perform wireless communication, the terminal 103 transmits a Subscribe signal for acquiring detail information of the service (S805). The terminal 102 transmits a Publish signal including detail information of the service (S806).

As described above, the terminal 103 can grasp which DW the terminal 102 can receive a signal so that wasteful transmission of a Subscribe signal can be prevented.

Because the proxy apparatus transmits by proxy the service information of the proxy client apparatus, the proxy client apparatus is not required to have an awake state in all DWs for communication of its service information, which can reduce power consumption of the entire system. While the proxy client apparatus can execute other processes without performing communication for NAN while the proxy apparatus is requesting proxy transmission of service information. Thus, processes can be executed efficiently.

Having described above that a period in which a proxy client apparatus performs wireless communication is represented by a DW, it may be a period in which the proxy client apparatus performs wireless communication outside a DW. A proxy apparatus may acquire communication parameters such as channel information and a network identifier in a period in which a proxy client apparatus performs wireless communication and notify them to the Subscriber. A proxy client apparatus may possibly communicate over another wireless network in a period excluding a period for communicating in a NAN cluster. Therefore, the Subscriber may acquire a period for performing wireless communication outside a DW and a communication parameter such as channel information of the proxy client apparatus so that the Subscriber can start communication with the proxy client apparatus without waiting for a DW in which the proxy client apparatus is enabled to communicate.

In this case, the Register signal and Descriptor signal may have a field for including communication parameters such as a communication method over a wireless network by which the proxy client apparatus performs communication outside a DW and channel information for communication outside a DW.

When the terminal 103 acquires from the proxy apparatus communication parameters for communicating with the proxy client apparatus outside a DW, the terminal 103 may start communication with the proxy client apparatus based on the acquired communication parameters before a DW in which the proxy client apparatus is enabled to perform wireless communication is started as a result of the processing in S308 or S316.

Next, operations of the communication system will be described in a case where the terminal 103 operating as a Subscriber acquires communication parameters for communicating with the terminal 102 operating as a proxy client apparatus outside a DW from the terminal 101 operating as a proxy apparatus to start communication with the terminal 102. The operations will be described with reference to the sequence chart illustrated in FIG. 8.

FIG. 8 illustrates DWs 1207 and 1208 in a NAN cluster. The terminal 102 performs NAN communication in the DW 1207 and performs communication over a different wireless communication in the other periods. The terminal 102 transmits a Register signal for requesting proxy transmission of service information to the terminal 101 (S1201). The Register signal transmitted in S1201 includes communication parameters necessary for communication over a wireless network for communication outside a period in which the terminal 102 performs NAN communication.

The terminal 101 registers the service information included in the received Register signal. The terminal 101 notifies that the service information has been registered and that proxy transmission is to be started to the terminal 102 by using a Descriptor signal (S1202).

The terminal 103 receives a service search instruction and transmits a Subscribe signal (S1203). Because the terminal 102 is performing communication over a different wireless network from the wireless network for performing NAN communication, the Subscribe signal transmitted from the terminal 103 in S1203 is not received.

After receiving the Subscribe signal from the terminal 103, the terminal 101 transmits a Descriptor signal including the service information of the terminal 102 and the communication parameters necessary for communication over a wireless network for communication outside a period for NAN communication (S1204). The terminal 103 changes the channel for communication with the terminal 102 and designates a network identifier based on the content of the Descriptor signal and transmits a Probe Request signal being a connection request (S1205). The terminal 102 responds by using a Probe Response signal (S1206). The terminal 102 and the terminal 103 establish a wireless connection therebetween by using Wi-Fi Direct (registered trademark), for example, and execute the service.

According to this embodiment, as described above, because transmitting service information of a proxy client apparatus from the proxy apparatus to the proxy apparatus can eliminate necessity for the proxy client apparatus to perform communication for NAN in all DWs in predetermined cycles. An apparatus requesting communication with the proxy client apparatus can acquire information for communication with the proxy client apparatus from the proxy apparatus. This can reduce the times when an apparatus requesting to communicate with a proxy client apparatus transmits unnecessary information in a period in which communication with the proxy client apparatus is disabled and the times when communication with the proxy client apparatus fails.

In a case where a proxy apparatus receives a Subscribe signal from a Subscriber in a period in which the proxy client apparatus does not perform wireless communication, the proxy apparatus may transmit a Subscribe signal to the proxy client apparatus in a period when the proxy client apparatus performs wireless communication.

Operations of the terminal 101 operating as the proxy apparatus in such a case will be described with reference to a flowchart illustrated in FIG. 9. The flowchart illustrated in FIG. 9 is started in response to a start of a DW of the NAN cluster to which the terminal 101 belongs. The flowchart illustrated in FIG. 9 is implemented by execution of a control program stored in the storage unit 201 and execution of arithmetic operations and modifications on information and control over hardware by the control unit 202 in the terminal 101. Some or all of steps in the flowchart illustrated in FIG. 9 may be configured to be implemented by hardware such as an ASIC. Like numbers refer to like steps of the processing in the flowcharts in FIG. 4 and FIG. 9, and repetitive detail descriptions will be omitted.

The processing in FIG. 9 is different from the processing in FIG. 4 in that S1501 and S1502 are additionally provided after S408 in the flowchart in FIG. 4. S1501 and S1502 will be described. After transmitting a Descriptor signal in S408, the terminal 101 waits until a period starts (S1501) in which a proxy client apparatus is enabled to perform wireless communication. When the period in which the proxy client apparatus is enabled to perform wireless communication starts, the terminal 101 transmits to the proxy client apparatus a Subscribe including an instruction to transmit a response signal to the source of the Subscribe signal received in S404 (S1502).

Next, operations to be performed by the terminal 103 based on service information of the proxy client apparatus acquired from the proxy apparatus will be described in a case where the terminal 103 operates as a Subscriber which executes a service together with the proxy client apparatus. The operations of the terminal 103 are different from the operations described with reference to FIGS. 3A and 3B in that the processing in S306 and the processing in S309 in the flowchart in FIGS. 3A and 3B are omitted and processing from S307 is performed after the processing in S305.

A sequence to be performed by a communication system will be described with reference to FIG. 10 in a case where the proxy apparatus transmits the received Subscribe signal to a proxy client apparatus in a period in which the proxy client apparatus performs wireless communication. FIG. 10 illustrates DWs 1707, 1708, 1709 and 1710 in a NAN cluster. It is assumed that the terminal 102 has an awake state in the DW 1707 and DW 1710 while having a sleep state in the other DWs. The terminal 102 transmits a Register signal for requesting proxy transmission of service information to the terminal 101 (S1701).

The terminal 101 registers service information included in a received Register signal. The terminal 101 notifies that the service information has been registered and proxy transmission has been started to the terminal 102 by using a Descriptor signal (S1702).

The terminal 103 receives a service search instruction and transmits a Subscribe signal (S1703). Because the terminal 102 has the sleep state, the terminal 102 does not receive the Subscribe signal transmitted from the terminal 103 in S1703.

If the terminal 101 receives the Subscribe signal from the terminal 103, the terminal 101 transmits a Descriptor signal including the service information of the terminal 102 (S1704). The terminal 101 analyzes a period in which the terminal 102 is enabled to perform wireless communication. The terminal 103 also analyzes the period in which the terminal 102 is enabled to perform wireless communication in order to receive a Publish signal including detail information of a service from the terminal 102 based on the received Descriptor signal.

When the DW 1710 period starts in which the terminal 102 is enabled to perform wireless communication, the terminal 101 transmits a Subscribe signal for acquiring detail information of the service where the Subscribe signal includes an instruction to transmit a Publish signal to the terminal 103 to the terminal 102 (S1705). The terminal 102 transmits the Publish signal including detail information of the service to the terminal 103 (S1706).

As described above, even when the terminal 103 transmits a Subscribe signal in a period in which the terminal 103 cannot communicate with the terminal 102, the terminal 101 transmits the Publish signal to the terminal 102 instead. Thus, the terminal 103 can acquire detail information of a service from the terminal 102.

Having described the case where the terminal 101 operating as a proxy apparatus transmits service information of one proxy client apparatus, the terminal 101 may transmit, by proxy, service information of a plurality of proxy client apparatuses. Operations to be performed by the terminal 101 for transmitting by proxy service information of a plurality of proxy client apparatus will be described with reference to the flowchart illustrated in FIGS. 11A and 11B.

The flowchart illustrated in FIGS. 11A and 11B is started in response to a start of a DW of the NAN cluster to which the terminal 101 belongs. The flowchart illustrated in FIGS. 11A and 11B is implemented by execution of a control program stored in the storage unit 201 and execution of arithmetic operations and modifications on information and control over hardware by the control unit 202 in the terminal 101. Some or all of steps in the flowchart illustrated in FIGS. 11A and 11B may be configured to be implemented by hardware such as an ASIC. Like numbers refer to like steps of the processing in the flowcharts in FIG. 4 and FIGS. 11A and 11B, and repetitive detail descriptions will be omitted.

The processing in FIGS. 11A and 11B is different from the processing in FIG. 4 in that the processing in S402 in the flowchart in FIG. 4 is changed to the processing in S1901 and processing in S1902 to S1907 are added thereafter. S1901 to S1902 will be described.

In response to a registration request received in S401, the terminal 101 determines the service indicated by the received registration request has already been registered by an apparatus different from the source apparatus of the registration request (S1901). The following description assumes that the source of the registration request received in S401 is the terminal 103 and the apparatus which has already been registered the service is the terminal 102. If it is determined in S1901 that the service indicated by the received registration request has not been registered yet by an apparatus different from the source apparatus of the registration request, the processing moves to S403.

If it is determined in S1901 on the other hand that the service indicated by the received registration request has already been registered by an apparatus different from the source apparatus of the registration request, the service indicated by the received registration request is registered (S1902). The terminal 101 then transmits a proxy approval including information regarding the terminal 102 having registered the service to the terminal 103 (S1903). The proxy approval transmitted in S1903 includes information describing that the service requested to register is executable by the terminal 102. The proxy approval transmitted in S1903 further includes information regarding a period in which the terminal 102 performs wireless communication.

The terminal 101 waits until a period starts in which the terminal 102 is enabled to perform wireless communication (S1904). When the period starts in which the terminal 102 is enabled to perform wireless communication, the terminal 101 transmits to the terminal 102 a Subscribe signal including information describing that the service requested to register is executable by the terminal 103 and information describing a period in which the terminal 103 performs wireless communication. The terminal 101 then acquires detail information of the service from the terminal 102 from the Publish signal (S1905).

The terminal 101 then waits until a period starts in which the terminal 103 performs wireless communication (S1906). When the period starts in which the terminal 103 performs wireless communication, the terminal 101 transmits to the terminal 103 a Publish signal including the detail information of the service acquired in S1905 to transfer the service information of the terminal 102 to the terminal 103 (S1907). The terminal 101 performs the processing from S401 again.

Thus, the proxy apparatus can relay the service information of the plurality of proxy client apparatuses so that the plurality of proxy client apparatuses can share the information that an executable service exists.

A sequence to be performed by a communication system will be described with reference to FIG. 12 in which a proxy apparatus transmits service information of a plurality of proxy client apparatuses by proxy. FIG. 12 illustrates DWs 2308 to 2313 of a NAN cluster. It is assumed that the terminal 102 has an awake state in the DW 2308 and DW 2311 while having a sleep state in the other DWs. It is assumed that the terminal 103 has an awake state in the DW 2309 and DW 2313 while having a sleep state in the other DWs.

The terminal 102 transmits a Register signal for requesting proxy transmission of service information to the terminal 101 (S2301). The terminal 101 registers service information included in a received Register signal. The terminal 101 notifies that the service information has been registered and proxy transmission has been started to the terminal 102 by using a Descriptor signal (S2302).

The terminal 103 transmits a Register signal for requesting proxy transmission of service information to the terminal 101 (S2303). The terminal 101 registers service information included in a received Register signal. The terminal 101 further recognizes that the service information included in the Register signal received from the terminal 103 is matched with the already registered service information of the terminal 102. The terminal 101 notifies that the service information has been registered and proxy transmission has been started to the terminal 103 by using a Descriptor signal (S2304). The Descriptor signal transmitted in S2304 includes information describing that the service registered by the terminal 102 is executable and information describing a period in which the terminal 102 is enabled to perform wireless communication.

The terminal 101 analyzes a period in which the terminal 102 is enabled to perform wireless communication. When the period in which the terminal 102 is enabled to wireless communication starts, the terminal 101 transmits a Subscribe signal to the terminal 102 (S2305). The Subscribe signal transmitted in S2305 includes information that the service registered by the terminal 103 is executable and information describing a period in which the terminal 103 is enabled to perform wireless communication. The terminal 102 transmits a Publish signal including detail information of the service to the terminal 101 (S2306).

In response to the Publish signal received from the terminal 102, the terminal 101 analyzes a period in which the terminal 103 performs wireless communication. When the period starts in which the terminal 103 performs wireless communication, the terminal 101 transfers the Publish signal acquired from the terminal 102 to the terminal 103 (S2307).

The proxy apparatus can relay service information of a plurality of proxy client apparatuses as described above. According to this embodiment, an apparatus requesting to acquire service information can acquire service information of a different apparatus even in a period in which the different apparatus is not enabled to perform wireless communication and can perform communication for executing the service even in a period in which the other apparatus is enabled to perform wireless communication.

Other Embodiments

Having described that, according to the aforementioned embodiment, a Subscribe signal and a Publish signal are communicated through a proxy apparatus, the proxy apparatus may relay a Follow-up signal.

Alternatively, a plurality of proxy apparatuses and proxy client apparatuses may be provided.

Having described that, according to the aforementioned embodiment, the Descriptor signal and the Register signal are used, the Subscribe and the Publish or the Follow-up signal may be used instead. Information including the Descriptor signal and the Register signal may be entered to the Vender Specific Attribute field. A communication scheme may be designated by using NAN Connection Capability Attribute.

Having described that, according to the aforementioned embodiment, a proxy apparatus has an awake state in all DWs, the proxy apparatus may have an awake state in all DW after it receives a registration request and may have a sleep state in DWs therebefore.

The present invention may be implemented by processing executed by supplying a program for implementing one of more functions of the aforementioned embodiment to a computer of a system or an apparatus over a network or through a storage medium and reading the program by one or more processors in the system or apparatus. The present invention can also be implemented by a circuit (such as an ASIC) implementing one or more functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-173289, filed Sep. 2, 2015, which is hereby incorporated by reference herein in its entirety.

The invention claimed is:

1. A communication apparatus comprising:
  a first receiving unit configured to receive, in at least one of a plurality of Discovery Windows (DWs) which comply with Neighbor Awareness Networking (NAN) standard and communicate service information, service information of a proxy client apparatus transmitted from a proxy server apparatus by proxy and identification information that makes it possible for the communication apparatus to distinguish, among the plurality of DWs, a DW which comes every predetermined number of DW and in which the proxy client apparatus is able to execute communication to perform a service indicated by service information of the proxy client apparatus from the proxy server apparatus;
  a first determining unit configured to determine a DW in which the proxy client apparatus is able to execute communication to perform a service indicated by service information of the proxy client apparatus among the plurality of DWs based on the identification information received by the first receiving unit; and
  a first communicating unit configured to perform communication with the proxy client apparatus for executing a service indicated by the service information of the proxy client apparatus in the DW determined by the first determining unit.

2. The communication apparatus according to claim 1, wherein the first communicating unit performs communication for acquiring detail information of the service indicated by the service information of the proxy client apparatus received by the first receiving unit.

3. The communication apparatus according to claim 1, wherein the first communicating unit performs communication for establishing a wireless connection for performing the service indicated by the service information of the proxy client apparatus received by the first receiving unit.

4. The communication apparatus according to claim 1, further comprising:
  a second receiving unit configured to receive, in at least one of the plurality of DWs, receive service information that does not include the service information of the proxy client apparatus and includes service information of the proxy server apparatus; and
  a second communicating unit configured to perform communication with the proxy server apparatus for executing a service indicated by the service information of the proxy server apparatus received by the second receiving unit.

5. The communication apparatus according to claim 1, further comprising:
  a second determining unit configured to, in a case where the service information is received by the first receiving unit or the second receiving unit, determine whether the received service information includes the service information of the proxy client apparatus or not; and
  a control unit configured to switch whether to communicate with the proxy client apparatus by the first communicating unit or to communicate with the proxy server apparatus by the second communicating unit, based on a result of determination by the second determining unit.

6. The communication apparatus according to claim 5, wherein, based on determining by the second determining unit that the received service information includes the service information of the proxy client apparatus, the control unit performs switching to acquire, from the proxy client apparatus, detail information of the service indicated by the service information of the proxy client apparatus by the first communicating unit, and
  wherein, based on determining by the second determining unit that the received service information does not include the service information of the proxy client apparatus, the control unit performs switching to establish a wireless connection with the proxy server apparatus for performing the service indicated by the service information of the proxy server apparatus by the second communicating unit.

7. The communication apparatus according to claim 4, further comprising:
  a transmitting unit configured to transmit, in at least one of the plurality of DWs, a signal for requesting the proxy server apparatus to transmit service information;
  wherein, in a case where the signal transmitted by the transmitting unit includes information that requests for transmission of the service information of the proxy client apparatus, control is performed such that the service information of the proxy client apparatus is received by the first receiving unit.

8. The communication apparatus according to claim 7, wherein, in a case where the signal transmitted by the transmitting unit does not include information that requests for transmission of the service information of the proxy client apparatus, control is performed such that the service information of the proxy server apparatus is received by the second receiving unit.

9. The communication apparatus according to claim 1, wherein the DW in which the proxy client apparatus is able to execute communication to perform the service indicated by the service information of the proxy client apparatus is a DW of an awake state in which power consumption is larger than in a sleep state in which the proxy client apparatus is not able to execute communication to perform the service indicated by the service information of the proxy client apparatus.

10. A communication apparatus comprising:
  a first transmitting unit configured to transmit service information which is requested by a proxy client apparatus to be transmitted by proxy and identification information that enables another communication apparatus to distinguish, among a plurality of Discovery Windows (DWs) which comply with Neighbor Awareness Networking (NAN) standard and communicate service information, a DW which comes every predetermined number of DW and in which the proxy client apparatus is able to execute communication to perform a service indicated by service information of the proxy client apparatus; and an instructing unit configured to instruct the proxy client apparatus in a DW in which the proxy client apparatus is able to execute communication to perform a service indicated by service information of the proxy client apparatus to perform communication, with said another communication apparatus, for executing a service indicated by service information of the proxy client apparatus transmitted by the first communication unit to said another communication apparatus.

11. The communication apparatus according to claim 10, wherein the instructing unit instructs the proxy client apparatus to communicate detail information of the service indicated by the service information of the proxy client apparatus with said another communication apparatus.

12. The communication apparatus according to claim 10, further comprising:

a first receiving unit configured to receive a registration request that requests for registering service information from the proxy client apparatus; and a first determining unit configured, based on the registration request received by the first receiving unit, determine a DW in which the proxy client apparatus is able to perform communication for executing the service indicated by the service information of the proxy client apparatus.

13. The communication apparatus according to claim 10, further comprising:

a notifying unit configured to, in a case where the service corresponding to the service information requested to be registered by the registration request received by the first receiving unit has already been registered, notify the apparatus that requests for registering the service information corresponding to the service that has already been registered of information regarding the proxy client apparatus.

14. The communication apparatus according to claim 10, further comprising:

a second transmitting unit configured not to transmit the service information of the proxy client apparatus and configured to transmit the service information of the proxy server apparatus.

15. The communication apparatus according to claim 14, further comprising:

a second receiving unit configured to receive a request signal that requests for service information from said another communication apparatus;

a second determining unit configured to determine whether the request signal received by the second receiving unit includes information that requests for transmission of the service information of the proxy client apparatus or not; and a control unit configured to switch whether to transmit the service information of the proxy client apparatus by the first transmitting unit or to transmit the service information of the proxy server apparatus by the second transmitting unit, based on a result of determination by the second determining unit.

16. The communication apparatus according to claim 10, further comprising:

a third transmitting unit configured to, in a case where the communication apparatus transmits the service information of the proxy client apparatus by proxy, transmit in the DW a beacon indicating that the communication apparatus is operating as the proxy server apparatus.

17. The communication apparatus according to claim 10, wherein, in a case of transmitting the service information of the proxy client apparatus by proxy, it is more frequent that the communication apparatus becomes able to perform wireless communication in the DW than in a case of not transmitting the service information of the proxy client apparatus by proxy.

18. A communication method comprising:

receiving, in at least one of a plurality of Discovery Windows (DWs) which comply with Neighbor Awareness Networking (NAN) standard and communicate service information, service information of a proxy client apparatus transmitted from a proxy server apparatus by proxy and identification information that makes it possible for the communication apparatus to distinguish, among the plurality of DWs, a DW which comes every predetermined number of DW and in which the proxy client apparatus is able to execute communication to perform a service indicated by service information of the proxy client apparatus from the proxy server apparatus;

determining a DW in which the proxy requesting apparatus is able to execute communication to perform a service indicated by service information of the proxy client apparatus among the plurality of DWs based on the identification information received by the first receiving unit; and performing communication with the proxy requesting apparatus for executing a service indicated by the service information of the proxy requesting apparatus.

19. A communication method comprising:

transmitting service information which is requested by a proxy client apparatus to be transmitted by proxy and identification information that enables another communication apparatus to distinguish, among a plurality of Discovery Windows (DWs) which comply with Neighbor Awareness Networking (NAN) standard and communicate service information, a DW which comes every predetermined number of DW and in which the proxy client apparatus is able to execute communication to perform a service indicated by service information of the proxy client apparatus;

instructing the proxy client apparatus in a DW in which the proxy client apparatus is able to execute communication to perform a service indicated by service information of the proxy client apparatus to perform communication, with said another communication apparatus, for executing a service indicated by service information of the proxy client apparatus transmitted by the first communication unit to said another communication apparatus.

20. A non-transitory computer-readable storage medium storing a computer program for causing a communication apparatus to function as:

a first receiving unit configured to receive, in at least one of a plurality of Discovery Windows (DWs) which comply with Neighbor Awareness Networking (NAN) standard and communicate service information, service information of a proxy client apparatus transmitted from a proxy server apparatus by proxy and identification information that makes it possible for the communication apparatus to distinguish, among the plurality of DWs, a DW which comes every predetermined number of DW and in which the proxy client apparatus is able to execute communication to perform a service indicated by service information of the proxy client apparatus from the proxy server apparatus;

a first determining unit configured to determine a DW in which the proxy client apparatus is able to execute communication to execute a service indicated by service information of the proxy client apparatus among the plurality of DWs based on the identification information received by the first receiving unit; and a first communicating unit configured to perform communication with the proxy requesting apparatus for executing a service indicated by the service information of the proxy requesting apparatus in the DW determined by the first determining unit.

21. A non-transitory computer-readable storage medium storing a computer program for causing a communication apparatus to function as:

a first transmitting unit configured to transmit service information of is requested by a proxy client apparatus to be transmitted by proxy and identification information that enables another communication apparatus to distinguish, among a plurality of Discovery Windows (DWs) which comply with Neighbor Awareness Networking (NAN) standard and communicate service information, a DW which comes every predetermined number of DW and in which the proxy client apparatus is able to execute communication to perform a service indicated by service information of the proxy client apparatus; and an instructing unit configured to instruct the proxy client apparatus in a DW in which the proxy client apparatus is able to execute communication to perform a service indicated by service information of the proxy client apparatus to perform communication, with said another communication apparatus, for executing a service indicated by service information of the proxy client apparatus transmitted by the first communication unit to said another communication apparatus.

* * * * *